(12) United States Patent
Corr

(10) Patent No.: US 6,245,254 B1
(45) Date of Patent: Jun. 12, 2001

(54) LUBRICANTS

(75) Inventor: Stuart Corr, Runcorn (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 08/976,658

(22) Filed: Nov. 24, 1997

Related U.S. Application Data

(63) Continuation of application No. 07/957,080, filed on Oct. 7, 1992, now abandoned.

(30) Foreign Application Priority Data

| Oct. 11, 1991 | (GB) | ................................................ 9121657 |
| Jul. 22, 1992 | (GB) | ................................................ 9215602 |

(51) Int. Cl.$^7$ .................................................. C09K 5/00
(52) U.S. Cl. .................................. 252/68; 252/67; 252/73
(58) Field of Search ........................... 252/524, 67, 68, 252/73

(56) References Cited

U.S. PATENT DOCUMENTS

| 4,851,144 | * | 7/1989 | McGraw et al. | .................. 252/52 A |
| 4,959,169 | * | 9/1990 | McGraw et al. | ...................... 252/68 |
| 4,978,467 | * | 12/1990 | Shenkland et al. | .................... 252/69 |
| 5,021,179 | * | 6/1991 | Zehler et al. | ....................... 252/56.6 |
| 5,021,180 | * | 6/1991 | McGraw | ................................ 252/68 |
| 5,185,092 | | 2/1993 | Fukuda et al. | ......................... 252/56 |
| 5,185,094 | * | 2/1993 | Shiflett | ................................. 252/67 |
| 5,202,044 | | 4/1993 | Hagihara et al. | ...................... 252/68 |
| 5,211,884 | | 5/1993 | Bunemann et al. | .................... 252/56 |
| 5,229,025 | | 7/1993 | Carter et al. | ............................ 252/68 |
| 5,370,811 | * | 12/1994 | Yoshida et al. | ........................ 252/67 |

FOREIGN PATENT DOCUMENTS

| 0406479 | | 1/1991 | (EP) | ........................... C10M/105/38 |
| 0430169 | | 6/1991 | (EP) | ................................ C09K/5/04 |
| 0430657 | | 6/1991 | (EP) | ................................ C09K/5/04 |
| 0435253 | | 7/1991 | (EP) | ........................... C10M/105/36 |
| 0445611 | | 9/1991 | (EP) | ........................... C10M/105/00 |
| 0448402 | | 10/1991 | (EP) | ........................... C10M/169/04 |
| 0451692 | | 10/1991 | (EP) | ................................ C09K/5/00 |
| 0461262 | | 12/1991 | (EP) | ........................... C10M/169/04 |
| 0470788 | | 2/1992 | (EP) | ........................... C10M/105/38 |
| 0485979 | * | 5/1992 | (EP) . | |
| 0496937 | | 8/1992 | (EP) | ........................... C10M/129/18 |
| 0498152 | | 8/1992 | (EP) | ........................... C10M/171/00 |
| 0499994 | | 8/1992 | (EP) | ........................... C10M/105/38 |
| 6479288 | | 3/1989 | (JP) | ................................ C09K/5/00 |
| 388892 | | 4/1991 | (JP) | ........................... C10M/105/38 |
| 3217493 | | 9/1991 | (JP) | ........................... C10M/105/38 |
| 3217498 | | 9/1991 | (JP) | ........................... C10M/169/04 |
| 3281687 | | 12/1991 | (JP) | ................................ C09K/5/04 |
| 472390 | | 3/1992 | (JP) | ........................... C10M/105/38 |
| 485396 | | 3/1992 | (JP) | ........................... C10M/105/38 |
| 4314793 | | 11/1992 | (JP) | ........................... C10M/105/42 |
| 9012849 | * | 11/1990 | (WO) . | |
| WO90/12849 | | 11/1990 | (WO) | ................................ C09K/5/04 |
| WO92/12223 | | 12/1991 | (WO) | ........................... C10M/105/38 |
| WO92/11338 | | 7/1992 | (WO) | ................................ C09K/5/04 |
| WO92/11339 | | 7/1992 | (WO) | ................................ C09K/5/04 |

OTHER PUBLICATIONS

Sanvordenker, "Materials Compatibility of R134a in Refrigerant Systems", ASHRAE Winter Meeting, Jan. 1989 pp. 211–216.

* cited by examiner

*Primary Examiner*—Necholus Ogden
(74) *Attorney, Agent, or Firm*—Pillsbury Winthrop LLP

(57) ABSTRACT

A working fluid composition comprising:

(A) a heat transfer fluid comprising a mixture of at least two compounds selected from the group consisting of hydrofluoroalkanes and fluoroalkanes; and (B) sufficient to provide lubrication of a lubricant which is at least partially soluble in each component of the heat transfer fluid.

6 Claims, No Drawings

LUBRICANTS

This is a continuation of application Ser. No. 07/957,080, filed on Oct. 7, 1992, which was abandoned.

The present invention relates generally to lubricants and more particularly to working fluid compositions contained in heat transfer devices which comprise the lubricant and a heat transfer fluid.

Heat transfer devices of the mechanical compression type such as those used in refrigerators, freezers, heat pumps and automobile air conditioning systems are well known. In such devices a heat transfer fluid of a suitable boiling point evaporates at low pressure taking heat from a surrounding zone. The resulting vapour is then compressed and passes to a condenser where it condenses and gives off heat to a second zone. The condensate is then returned through an expansion valve to the evaporator so completing the cycle. The mechanical energy required for compressing the vapour and pumping the fluid is provided by, for example, an electric motor or an internal combustion engine.

The heat transfer fluids used in these heat transfer devices include chlorine containing fluoroalkanes such as dichlorodifluoromethane (R-12), chlorodifluoromethane (R-22) and mixtures thereof with, for example, fluoroalkanes such as 1,1-difluoroethane (R-152a). However, such chlorine containing fluoroalkanes have been implicated in the destruction of the ozone layer and as a result the use and production thereof is to be severely limited by international agreement. The use of certain fluoroalkanes and hydrofluoroalkanes in place of the chlorine containing fluoroalkanes has been proposed. The fluoroal-kanes and hydrofluoroalkanes of particular interest are those compounds which have comparable boiling points and other thermal properties to the chlorine containing fluoroalkanes which they are replacing, but which are also less damaging or benign to the ozone layer. Thus, R-12 is generally being replaced by a new refrigerant, 1,1,1,2-tetrafluoroethane (R-134a).

Hitherto, heat transfer devices have tended to use mineral oils as lubricants. The good solubility of chlorine containing fluoroalkanes with mineral oils allows the mineral oil to circulate around the heat transfer device together with the chlorine containing fluoroalkane, and this in turn ensures proper lubrication of the compressor. Unfortunately, however, the replacement fluoroalkane and hydrofluoroalkane heat transfer fluids such as R-134a have different solubility characteristics to the chlorine containing fluoroalkanes presently in use and tend to be insufficiently soluble in mineral oils to allow the latter to be used as lubricants. Consequently, numerous alternative lubricants such as polyoxyalkylene glycols terminating in hydroxyl and other groups, esters of polyols with mono- and polyfunctional acids, and halo substituted esters and ethers have been proposed as lubricants for use with the replacement heat transfer fluids.

Unfortunately, R-134a cannot be used as a direct replacement for certain of the refrigerants which are presently in use such as R-22 and R-502 (an azeotropic mixture of R-22 and chloropentafluoroethane R-115) since it does not possess comparable boiling characteristics and thermal properties. It has thus been proposed that existing refrigerants such as R-22 and R-502 be replaced by refrigerant mixtures comprising two or more refrigerants selected from the fluoroalkanes and hydrofluoroalkanes. Particular mention may be made of binary mixtures of refrigerants such as R-134a and difluoromethane (R-32) or R-32 and pentafluoroethane (R-125). Unfortunately, these refrigerant mixtures are also not sufficiently soluble in mineral oils to allow the latter to be used as lubricants. Moreover, the miscibility and solubility of an alternative lubricant with one component of the mixture, for example with R-134a, does not mean that such a lubricant will also be miscible and soluble with the refrigerant mixture itself. In consequence, the development of a lubricant which exhibits acceptable lubricating properties in a heat transfer device utilising a refrigerant mixture presents a very real problem.

It has now been found that if a prospective lubricant is at least partially soluble in each component of the refrigerant mixture then it will be at least partially soluble in the refrigerant mixture itself, thereby enabling its use as a lubricant with that mixture. Such a lubricant may provide an acceptable lubricating action even if it is immiscible with one or more of the components of the refrigerant mixture or with the refrigerant mixture itself.

According to the present invention there is provided a working fluid composition comprising
 (A) a heat transfer fluid comprising a mixture of at least two compounds selected from the group consisting of hydrofluoroalkanes and fluoroalkanes; and
 (B) sufficient to provide lubrication of a lubricant which is at least partially soluble in each component of the heat transfer fluid.

The heat transfer fluid may comprise two, three or more components. Preferred hydrofluoroalkanes and fluoroalkanes are selected from the group consisting of difluoromethane (R-32), 1,1,2,2-tetrafluoroethane (R-134), 1,1,1,2-tetrafluoroethane (R-134a), pentafluoroethane (R-125), 1,1-difluoroethane (R-152a), 1,1,1-trifluoroethane (R-143a) and 1,1,2-trifluoroethane (R-143).

One suitable heat transfer fluid comprises a mixture of R-32 and R-125. Such a mixture may comprise equal proportions of each component on a weight basis.

The present invention is particularly concerned with the provision of a working fluid composition which provides a useful replacement for the working fluids presently in use which comprise R-22 or R-502 as the refrigerant and a mineral oil lubricant. A particularly desirable working fluid composition in this respect is one which comprises
 (A) a heat transfer fluid comprising a mixture of:
  (1) tetrafluoroethane;
  (2) at least one hydrofluoroalkane selected from the group consisting of difluoromethane (R-32) and 1,1,1-trifluoroethane (R-143a); and optionally (3) pentafluoroethane (R-125); and
 (B) sufficient to provide lubrication of a lubricant which is at least partially soluble in each component of the heat transfer fluid.

The tetrafluoroethane may be 1,1,1,2-tetrafluoroethane (R-134a) or 1,1,2,2-tetrafluoroethane (R-134) or a mixture of these two isomers. Preferably, however, the tetrafluoroethane is a single isomer, and more preferably is R-134a.

Although the heat transfer fluid may comprise more than three components, it is preferably a binary or ternary mixture. The mixture may be an azeotrope or near-azeotrope, but will normally be zeotropic.

In one preferred embodiment of the present invention, the heat transfer fluid is a binary mixture consisting essentially of R-134a and R-32. Such a mixture provides a particularly suitable replacement for the R-22 refrigerant which has been used hitherto in commercial refrigeration systems and related heat transfer devices. Preferably, such a mixture comprises from 45 to 75% by weight, more preferably from 65 to 75% by weight of R-134a and from 25 to 55% by weight, more preferably from 25 to 35% by weight of R-32. A particularly preferred binary mixture comprises about 70% by weight of R-134a and about 30% by weight of R-32.

In a further preferred embodiment of the present invention, the heat transfer fluid comprises a ternary or higher mixture of:

(1) R-134a or R-134;

(2) at least one hydrofluoroalkane selected from the group consisting of R-32 and R-143a; and optionally (3) R-125.

Such a heat transfer fluid provides a suitable replacement for the R-22 and R-502 refrigerants which have been used hitherto in commercial refrigeration systems and related heat transfer devices.

Particularly suitable ternary heat transfer fluids may be selected from:

(a) R-134a+R-32+R-143a;

(b) R-134+R-32 +R-143a;

(c) R-134a+R-32 +R-125;

(d) R-134+R-32 +R-125;

(e) R-134a+R-143a +R-125; and (f) R-134+R-143a+R-125.

A particularly preferred heat transfer fluid comprises a mixture of:

(1) R-134a or R-134, especially R-134a;

(2) R-32 or R-143a, especially R-32; and (3) R-125.

Such heat transfer fluids provide a particularly suitable replacement for R-22 and R-502.

One particularly preferred ternary heat transfer fluid for replacing R-22 is a mixture consisting of:

(1) 55 to 65% by weight, particularly about 60% by weight of R-134a;

(2) 25 to 35% by weight, particularly about 30% by weight of R-32; and (3) 5 to 15% by weight, particularly about 10% by weight of R-125.

Another particularly preferred ternary heat transfer fluid for replacing R-22 is a mixture consisting of:

(1) 25 to 35% by weight, particularly about 30% by weight of R-134a;

(2) 45 to 55% by weight, particularly about 50% by weight of R-32; and (3) 15 to 25% by weight, particularly about 20% by weight of R-125.

One particularly preferred ternary heat transfer fluid for replacing R-502 is a mixture consisting of:

(1) 45 to 55% by weight, particularly about 50% by weight of R-134a;

(2) 25 to 35% by weight, particularly about 30% by weight of R-32; and (3) 15 to 25% by weight, particularly about 20% by weight of R-125.

Another particularly preferred ternary heat transfer fluid for replacing R-502 is a mixture consisting of:

(1) 45 to 55% by weight, particularly about 50% by weight of R-134a;

(2) 35 to 45% by weight, particularly about 40% by weight of R-32; and (3) 5 to 15% by weight, particularly about 10% by weight of R-125.

All the percentages by weight quoted above are based on the total weight of the ternary heat transfer fluid.

Suitable lubricants may be selected from those currently used with R-134a provided that the requirement of partial solubility is met.

Lubricants satisfying the requirement of partial solubility may, in particular, be selected from the class known in the art as polyoxyalkylene glycols. Suitable polyoxyalkylene glycol lubricants include hydroxyl group initiated polyoxyalkylene glycols, e.g. ethylene and/or propylene oxide oligomers/polymers initiated on mono- or polyhydric alcohols such as methanol, butanol, pentaerythritol and glycerol. Such polyoxyalkylene glycols may also be end-capped with suitable terminal groups such as alkyl, e.g. methyl groups.

A preferred polyoxyalkylene glycol lubricant is one having an average molecular weight in the range of from about 150 to about 3000 and comprising one or more compounds of general formula:

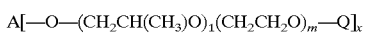

$$A[-O-(CH_2CH(CH_3)O)_l(CH_2CH_2O)_m-Q]_x \qquad I$$

wherein

A is the residue remaining after removing the hydroxyl groups from a hydroxyl containing organic compound;

Q represents an optionally substituted alkyl, aralkyl or aryl group;

l and m are independently 0 or an integer provided that at least one of l or m is an integer; and x is an integer.

The polyoxyalkylene glycol lubricant may be prepared using conventional techniques. Such techniques are well known to those skilled in the art. Thus, in one method a hydroxyl containing organic compound such as an alcohol is reacted with ethylene oxide and/or propylene oxide to form an ethylene oxide and/or propylene oxide oligomer/polymer containing terminal hydroxyl groups which is subsequently etherified to give a polyoxyalkylene glycol of Formula I. The polyoxyalkylene glycol lubricant which is finally formed will not usually consist of a single compound of Formula I, but will usually comprise a mixture of such compounds which vary from one another in respect of the degree of polymerisation, i.e. the number of ethylene and/or propylene oxide residues. Moreover, a mixture of alcohols and/or phenols may be used as initiators in the formation of the polyoxyalkylene glycol lubricant, and a mixture of etherifying agents which provide different Q groups may also be used. The molecular weight of a polyoxyalkylene glycol lubricant comprising a mixture of compounds of Formula I will represent the average molecular weight of all the compounds present, so that a given lubricant may contain specific polyoxyalkylene glycols which have a molecular weight outside the range quoted above, providing that the average molecular weight of all the compounds is within that range.

The moiety A in the polyoxyalkylene glycol of Formula I is the residue remaining after removing the hydroxyl groups from a hydroxyl containing organic compound. Such compounds include the mono- and polyhydric alcohols and phenols. Where the hydroxyl containing organic compound which is used as an initiator in the formation of the polyoxyalkylene glycol is a monohydric alcohol or phenol, A is preferably a hydrocarbyl group and more preferably is an alkyl, aryl, alkaryl or aralkyl group, especially alkyl. Suitable alkyl groups for A may be selected from the straight chain (linear), branched or cyclic alkyl groups. Preferably, A is a $C_{1-12}$, particularly a $C_{1-10}$ and especially a $C_{1-6}$ alkyl group. Specific examples of alkyl groups include methyl, ethyl, n-propyl, isopropyl, n-butyl, isobutyl, sec-butyl, tert-butyl, the various pentyl groups, the various hexyl groups, cyclopentyl, cyclohexyl and the like. Particularly preferred alkyl groups for A are the $C_{1-2}$, particularly the $C_{1-10}$ and especially the $C_{1-6}$ straight chain alkyl groups, examples of which have been listed above. An especially preferred alkyl group for A is methyl or n-butyl.

Other suitable hydrocarbyl groups for A are those which remain after removing a hydroxyl group(s) from benzyl alcohol and phenols such as phenol, cresol, nonylphenol, resorcinol and bisphenol A.

Where a polyhydric alcohol is used in the formation of the polyoxyalkylene glycol, A is preferably a hydrocarbon radical. Suitable hydrocarbon radicals for A are those which remain after removing the hydroxyl groups from polyhydric alcohols such as ethylene glycol, propylene glycol, 1,4-butanediol, 1,6-hexanediol, diethylene glycol, dipropylene glycol, cyclohexane dimethanol, glycerol, 1,2,6-hexane triol, trimethylolpropane, pentaerythritol, dipentaerythritol and sorbitol. A particularly preferred hydrocarbon radical for A is that remaining after removing the hydroxyl groups from glycerol.

The moiety Q in the polyoxyalkylene glycol of Formula I is an optionally substituted alkyl, aralkyl or aryl group. A preferred optionally substituted aralkyl group for Q is an optionally substituted benzyl group. Preferred optionally substituted aryl groups for Q include phenyl and alkyl substituted phenyl groups. Preferably, Q is an optionally substituted, for example halogen substituted, alkyl group, particularly an optionally substituted $C_{1-12}$ alkyl group and more particularly an optionally substituted $C_{1-4}$ alkyl group. Suitable alkyl groups for Q may be selected from the straight chain (linear), branched or cyclic alkyl groups, especially the linear alkyl groups. Although the alkyl groups for Q are described as being optionally substituted, they are preferably unsubstituted. Accordingly, particularly preferred alkyl groups for Q are selected from methyl, ethyl, propyl, isopropyl and the various butyl groups. An especially preferred alkyl group for Q is methyl.

The polyoxyalkylene glycol of Formula I may be a polyoxyethylene glycol, a polyoxypropylene glycol or a poly(oxyethylene/oxypropylene) glycol. In the latter case, the ethylene and propylene oxide residues may be arranged randomly or in blocks along the polymer chain. Preferred polyoxyalkylene glycols are the polyoxypropylene glycols and the poly(oxyethyleneloxypropylene) glycols.

Particularly preferred lubricants for use in the working fluid compositions of the invention are those selected from the class known as neopentyl polyol esters due, inter alia, to their generally high level of thermal stability. Suitable neopentyl polyol esters include the esters of pentaerythritol, polypentaerythritols such as di- and tripentaerythritol, trimethylol alkanes such as trimethylol ethane and trimethylol propane, and neopentyl glycol. Such esters may be formed with linear and/or branched aliphatic carboxylic acids, such as linear and/or branched alkanoic acids, or esterifiable derivatives thereof. A minor proportion of an aliphatic polycarboxylic acid, e.g. an aliphatic dicarboxylic acid, or an esterifiable derivative thereof may also be used in the synthesis of the ester lubricant in order to increase the viscosity thereof. However, where such an aliphatic polycarboxylic acid (or esterifiable derivative thereof) is employed in the synthesis, it will preferably constitute no more than 30 mole %, more preferably no more than 10 mole % of the total amount of carboxylic acids (or esterifiable derivatives thereof) used in the synthesis. Usually, the amount of the carboxylic acid(s) (or esterifiable derivative thereof) which is used in the synthesis will be sufficient to esterify all of the hydroxyl groups contained in the polyol, but in certain circumstances residual hydroxyl functionality may be acceptable.

A preferred neopentyl polyol ester lubricant is one comprising one or more compounds of general formula:

II wherein
R is the hydrocarbon radical remaining after removing the hydroxyl groups from pentaerythritol, dipentaerythritol, tripentaerythritol, trimethylol ethane, trimethylol propane or neopentyl glycol, or the hydroxyl containing hydrocarbon radical remaining after removing a proportion of the hydroxyl groups from pentaerythritol, dipentaerythritol, tripentaerythritol, trimethylol ethane, trimethylol propane or neopentyl glycol;

each $R^1$ is, independently, H, a straight chain (linear) aliphatic hydrocarbyl group, a branched aliphatic hydrocarbyl group, or an aliphatic hydrocarbyl group (linear or branched) containing a carboxylic acid or carboxylic acid ester substituent, provided that at least one $R^1$ group is a linear aliphatic hydrocarbyl group or a branched aliphatic hydrocarbyl group; and n is an integer.

The aliphatic hydrocarbyl groups specified for $R^1$ above may be substituted, e.g. by pendant atoms or groups such as chloro, fluoro and bromo, and/or by in chain hetero atoms such as oxygen and nitrogen. Preferably, however, such hydrocarbyl groups are unsubstituted and, except in the case where $R^1$ is an aliphatic hydrocarbyl group containing a carboxylic acid or carboxylic acid ester substituent, contain only carbon and hydrogen atoms.

The ester lubricants of Formula II may be prepared by reacting the appropriate polyol or mixture of polyols with the appropriate carboxylic acid or mixture of acids. Esterifiable derivatives of the carboxylic acids may also be used in the synthesis, such as the acyl halides, anhydrides and lower alkyl esters thereof. Suitable acyl halides are the acyl chlorides and suitable lower alkyl esters are the methyl esters. Aliphatic polycarboxylic acids, or esterifiable derivatives thereof, may also be used in the synthesis of the ester lubricant. Where an aliphatic polycarboxylic acid is used in the synthesis of the ester lubricant, the resulting lubricant will comprise one or more compounds of Formula II in which at least one of the $R^1$ groups is an aliphatic hydrocarbyl group (linear or branched) containing a carboxylic acid or carboxylic acid ester substituent. The ability of polycarboxylic acids to react with two or more alcohol molecules provides a means of increasing the molecular weight of the ester formed and so a means of increasing the viscosity of the lubricant. Examples of such polycarboxylic acids include maleic acid, adipic acid and succinic acid, especially adipic acid. Generally, however, only monocarboxylic acids (or esterifiable derivatives thereof) will be used in the synthesis of the ester lubricant, and where polycarboxylic acids are used they will be used together with one or more monocarboxylic acids (or esterifiable derivatives thereof) and will constitute only a minor proportion of the total amount of carboxylic acids used in the synthesis. Where an aliphatic polycarboxylic acid (or an esterifiable derivative thereof) is employed in the synthesis, it will preferably constitute no more than 30 mole %, more preferably no more than 10 mole % of the total amount of carboxylic acids used in the synthesis, with one or more monocarboxylic acids (or esterifiable derivatives thereof) constituting the remainder.

Usually, the amount of the carboxylic acid(s) (or esterifiable derivative thereof) which is used in the synthesis will be sufficient to esterify all of the hydroxyl groups contained in the polyol(s), in which case the resulting lubricant will comprise one or more compounds of Formula II in which R is the hydrocarbon radical remaining after removing the hydroxyl groups from pentaerythritol, dipentaerythritol, tripentaerythritol, trimethylol ethane, trimethylol propane or neopentyl glycol. However, in certain circumstances ester lubricants which comprise residual hydroxyl functionality may be acceptable. Such lubricants comprise one or more ester compounds of Formula II in which R is the hydroxyl containing hydrocarbon radical remaining after removing a proportion of the hydroxyl groups from pentaerythritol, dipentaerythritol, tripentaerythritol, trimethylol ethane, trimethylol propane or neopentyl glycol. Esters containing residual (unreacted) hydroxyl functionality are often termed partial esters, and lubricants containing them may be prepared by utilising an amount of the carboxylic acid or acids which is insufficient to esterify all of the hydroxyl groups contained in the polyol or polyols.

It will be appreciated that the preferred neopentyl polyol ester lubricants may comprise a single compound of Formula II, i.e. the reaction product which is formed between a single polyol and a single monocarboxylic acid. However, such ester lubricants may also comprise a mixed ester composition comprising two or more compounds of Formula II. Such mixed ester compositions may be prepared by utilising two or more polyols and/or two or more carboxylic acids (or esterifiable derivatives thereof) in the synthesis of the ester, or by combining a mixture of different esters each of which is the reaction product of a particular polyol and a particular carboxylic acid. Furthermore, different mixed ester compositions, each of which has been prepared by utilising two or more polyols and/or two or more carboxylic acids (or esterifiable derivatives thereof) in their synthesis, may also be blended together.

The preferred neopentyl polyol ester lubricants comprise one or more compounds of Formula II in which R is the hydrocarbon radical remaining after removing the hydroxyl groups from pentaerythritol, dipentaerythritol, trimethylol propane or neopentyl glycol. Particularly preferred alcohols for the synthesis of the ester are pentaerythritol, dipentaerythritol and trimethylol propane.

Preferably, each $R^1$ in Formula II is, independently, a linear aliphatic hydrocarbyl group or a branched aliphatic hydrocarbyl group.

Preferred linear aliphatic hydrocarbyl groups for $R^1$ are the linear alkyl groups, particularly the $C_{3-10}$ linear alkyl groups, more particularly the $C_{5-10}$ linear alkyl groups and especially the $C_{5-8}$ linear alkyl groups. Examples of suitable linear alkyl groups include n-pentyl, n-hexyl, n-heptyl, n-octyl, n-nonyl and n-decyl. Esters containing such alkyl groups can be prepared by utilising a linear alkanoic acid in the synthesis of the ester.

Preferred branched aliphatic hydrocarbyl groups for $R^1$ are the branched alkyl groups, particularly the $C_{4-14}$ branched alkyl groups, more particularly the $C_{6-12}$ branched alkyl groups and especially the $C_{8-10}$ branched alkyl groups. Examples of suitable branched alkyl groups include isopentyl, isohexyl, isoheptyl, isooctyl, isononyl, isodecyl, 2-ethylbutyl, 2-methylhexyl, 2-ethylhexyl, 3,5,5-trimethylhexyl, neopentyl, neoheptyl and neodecyl. Esters containing such alkyl groups can be prepared by utilising a branched alkanoic acid in the synthesis of the ester.

In a particularly preferred embodiment of the present invention, the ester lubricant comprises one or more esters of general formula:

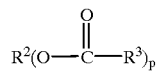

III wherein $R^2$ is the hydrocarbon radical remaining after removing the hydroxyl groups from pentaerythritol, dipentaerythritol or trimethylol propane;

each $R^3$ is, independently, a linear alkyl group or a branched alkyl group; and p is an integer of 3, 4 or 6, wherein one or more of the named polyols, one or more linear alkanoic acids, or esterifiable derivatives thereof, and optionally one or more branched alkanoic acids, or esterifiable derivatives thereof, are utilised in the synthesis of the ester lubricant.

Preferably, a mixture of two or more linear alkanoic acids, in particular two, or esterifiable derivatives thereof, are utilised in the synthesis of the ester. More preferably, a mixture of one or more linear alkanoic acids, or esterifiable derivatives thereof, and one or more branched alkanoic acids, or esterifiable derivatives thereof, are utilised in the synthesis. Thus, particularly preferred ester lubricants of the invention are mixed ester compositions which comprise a plurality of compounds of Formula III.

Where a mixture of linear and branched alkanoic acids (or esterifiable derivatives thereof) are utilised in the synthesis of the ester, as is preferred, the linear alkanoic acid(s) preferably constitutes at least 25 mole %, e.g from 25 to 75 mole %, of the total amount of carboxylic acids used. In this way, at least 25 mole %, e.g. from 25 to 75 mole %, of the hydroxyl groups contained in the polyol or mixture of polyols may be reacted with the said linear alkanoic acid(s).

Ester based lubricants comprising one or more compounds of Formula III provide a particularly good balance between the properties desired of a lubricant and, in particular, exhibit good thermal stability, good hydrolytic stability and acceptable solubility and miscibility with the heat transfer fluid. As stated previously, the present invention is particularly concerned with the provision of a working fluid composition which can replace the existing working fluid compositions comprising R-22 or R-502 as the refrigerant. Refrigeration systems which contain replacements for R-22 and R-502 typically operate at temperatures above those using R-134a as the sole replacement refrigerant. Thus, it is particularly desirable that the lubricant which is used in a working fluid composition designed to replace the existing compositions based on R-22 and R-502 exhibits good thermal stability.

Preferably, $R^2$ is the hydrocarbon radical remaining after removing the hydroxyl groups from pentaerythritol or dipentaerythritol.

Preferred linear and branched alkyl groups for $R^3$ are those described above in connection with $R^1$ and are derived by utilising the corresponding alkanoic acids or esterifiable derivatives thereof.

An especially preferred ester based lubricant comprises a mixed ester composition which comprises a plurality of esters of Formula III and which is the reaction product of pentaerythritol, heptanoic acid and a mixture of branched $C_{8-10}$ alkanoic acids. Preferably, the heptanoic acid will constitute from 25 to 75 mole % of the total amount of acids utilised in the synthesis, with the branched $C_{8-10}$ acids constituting the remainder. Esterifiable derivatives of the acids may also be used in the synthesis of the ester.

The lubricant will typically be part of a lubricant composition which also comprises one or more of the additives which are conventional in the refrigeration lubricants art. Specific mention may be made of oxidation resistance and thermal stability improvers, corrosion inhibitors, metal deactivators, viscosity index improvers, anti-wear agents and extreme pressure resistance additives. Such additives are well known to those skilled in the art. Where the lubricant is part of a lubricant composition containing one or more additives, such additives may be present in the amounts conventional in the art. Preferably, the cumulative weight of all the additives will not be more than 8%, e.g. 5%, of the total weight of the lubricant composition.

Suitable oxidation resistance and thermal stability improvers may be selected from the diphenyl-, dinaphthyl-, and phenylnaphthyl-amines, the phenyl and naphthyl groups of which may be substituted. Specific examples include N,N'-diphenyl phenylenediamine, p-octyldiphenylamine, p,p-dioctyldiphenylamine, N-phenyl-1-naphthyl amine, N-phenyl-2-naphthyl amine, N-(p-dodecyl)-phenyl-2-naphthyl amine, di-1-naphthyl amine, and di-2-naphthyl amine. Other suitable oxidation resistance and thermal stability improvers may be selected from the phenothiazines such as N-alkylphenothiazines, and the hindered phenols such as 6-(t-butyl) phenol, 2,6-di-(t-butyl) phenol, 4-methyl-2,6-di-(t-butyl) phenol and 4,4'-methylenebis(-2,6-di-[t-butyl] phenol).

Suitable cuprous metal deactivators may be selected from imidazole, benzamidazole, 2-mercaptobenzthiazole, 2,5-dimercaptothiadiazole, salicylidine-propylenediamine, pyrazole, benzotriazole, tolutriazole, 2-methylbenzamidazole, 3,5-dimethyl pyrazole, and methylene bis-benzotriazole. Examples of more general metal deactivators and/or corrosion inhibitors include organic acids and the esters, metal salts and anhydrides thereof, such as N-oleyl-sarcosine, sorbitan monooleate, lead naphthenate, dodecenyl-succinic acid and its partial esters and amides, and 4-nonylphenoxy acetic acid; primary, secondary and tertiary aliphatic and cycloaliphatic amines and amine salts of organic and inorganic acids, such as oil soluble alkylammonium carboxylates; heterocyclic nitrogen containing compounds, such as thiadiazoles, substituted imidazolines, and oxazolines; quinolines, quinones and anthraquinones; ester and amide derivatives of alkenyl succinic anhydrides or acids, dithiocarbamates, dithiophosphates; and amine salts of alkyl acid phosphates and their derivatives.

Suitable viscosity index improvers include polymethacrylate polymers, copolymers of vinyl pyrrolidone and methacrylates, polybutene polymers, and copolymers of styrene and acrylates.

Examples of suitable anti-wear and extreme pressure resistance agents include sulphurised fatty acids and fatty acid esters, such as sulphurised octyl tallate; sulphurised terpenes; sulphurised olefins; organopolysulphides; organo phosphorous derivatives including amine phosphates, alkyl acid phosphates, dialkyl phosphates, aminedithiophosphates, trialkyl and triaryl phosphorothionates, trialkyl and triaryl phosphines, and dialkylphosphites, e.g., amine salts of phosphoric acid monohexyl ester, amine salts of dinonylnaphthalene sulphonate, triphenyl phosphate, trinaphthyl phosphate, diphenyl cresyl and dicresyl phenyl phosphates, tricresyl phosphate, naphthyl diphenyl phosphate, triphenylphosphorothionate; dithiocarbamates, such as an antimony dialkyl dithiocarbamate; chlorinated and/or fluorinated hydrocarbons, and xanthates.

The working fluid compositions of the invention will typically comprise a major amount of the heat transfer fluid and a minor amount of the synthetic lubricant. Preferably, the working fluid compositions of the invention will comprise from 50 to 99% by weight, more preferably from 70 to 99% by weight, of the heat transfer fluid and from 1 to 50% by weight, more preferably from 1 to 30% by weight, of the lubricant based on the total weight thereof.

The working fluid compositions are useful in all types of compression cycle heat transfer devices. Thus, they may be used to provide cooling by a method involving condensing the heat transfer fluid and thereafter evaporating it in a heat exchange relationship with a body to be cooled. They may also be used to provide heating by a method involving condensing the heat transfer fluid in a heat exchange relationship with a body to be heated and thereafter evaporating it.

The working fluid compositions of the invention provide a good compromise between performance and low or zero ozone depletion. They are especially suitable for applications currently satisfied by refrigerants R-22 and R-502.

The present invention is now illustrated, but not limited, with reference to the following Examples.

The working fluid compositions of the invention which were investigated in the following Examples comprised a lubricant and a heat transfer fluid which was either a binary mixture of 1,1,1,2-tetrafluoro-ethane (R-134a) and difluoromethane (R-32) or a ternary mixture of 1,1,1,2-tetrafluoroethane (R-134a), difluoromethane (R-32) and pentafluoroethane (R-125).

1,1,1,2-tetrafluoroethane, difluoromethane and pentafluoroethane are at least partially soluble in each of the lubricants tested which means the converse is true, i.e. each of the lubricants tested will be at least partially soluble in each of these hydrofluoroalkanes. Moreover, each lubricant tested is at least partially soluble in the binary or ternary mixtures themselves.

EXAMPLE 1

In this Example various working fluid compositions were prepared comprising 15% w/w of a lubricant and the complementary percentage of a heat transfer fluid comprising (by weight) equal proportions of R-134a and R-32. The lower miscibility temperature of each composition, i.e. the lowest temperature at which the lubricant remained miscible with the heat transfer fluid, was determined. The method employed was as follows:

A set amount of the lubricant to be tested was placed in a previously evacuated thick walled test tube and the tube was then placed in a cooling bath regulated at the desired temperature. Once the tube was sufficiently cold, a set amount of the heat transfer fluid was condensed into the test tube. The tube was then removed from the cooling bath and the contents allowed to warm to room temperature. After the contents had been allowed to equilibriate at room temperature, they were agitated and visually examined for evidence of phase separation (the mixture looks cloudy). If there was no evidence of phase separation, the temperature of the mixture was lowered in a cooling bath at a rate of 1° C. per minute until phase separation was observed. The temperature at which phase separation was first observed was recorded as the lower miscibility temperature.

The results are shown in Table 1. Each lubricant is at least partially soluble in each of the components of the heat transfer fluid and also in the fluid itself.

The lower miscibility temperatures of a series of compositions comprising 15% w/w of a lubricant and the complementary percentage of a single hydrofluoroalkane selected from R-134a, R-32 and R-125 were also determined. The compositions were prepared and the lower miscibility temperatures determined using the procedure described above. The results are shown in Table 1A. In Table 1A it will be noticed that the lower miscibility temperatures are in some cases quoted as being less than −60° C. This means that at −60° C. phase separation was not observed.

TABLE 1

| LUBRICANT | LOWER MISCIBILITY TEMPERATURE (° C.) |
|---|---|
| PE6 | −27 |
| "EMKARATE" (TM) RL-212 | −3 |
| "EMKARATE" (TM) RL-184 | >10 |
| "EMKAROX" (TM) RL-118 | I |

TABLE 1A

| | LOWER MISCIBILITY TEMPERATURE (° C.) | | |
|---|---|---|---|
| LUBRICANT | R-134a | R-32 | R-125 |
| PE6 | <−60 | 0 | <−60 |
| "EMKARATE" (TM) RL-212 | −25 | >20 | <−60 |
| "EMKARATE" (TM) RL-184 | 10 | >20 | <−60 |
| "EMKAROX" (TM) RL-118 | <−60 | I | <−60 |

I—denotes immiscibility over the temperature range −50° C. to +20° C.

PE6 is an ester of pentaerythritol and n-hexanoic acid.

"EMKARATE" (TM) RL-212 is a commercially available ester based lubricant for use with R-134a obtainable from ICI Chemicals & Polymers Ltd. Specifically, the lubricant comprises an ester of trimethylol propane and heptanoic acid.

"EMKARATE" (TM) RL-184 is a commercially available ester based lubricant for use with R-134a obtainable from ICI Chemicals & Polymers Ltd. Specifically, the lubricant comprises an ester of pentaerythritol, heptanoic acid and a mixture of branched $C_{8-10}$ alkanoic acids.

"EMKAROX" (TM) RL-118 is a commercially available polyoxyalkylene glycol based lubricant for use with R-134a obtainable from ICI Chemicals & Polymers Ltd. Specifically, the lubricant comprises an end-capped polyoxyalkylene glycol.

"EMKARATE" and "EMKAROX" are trademarks of ICI Chemicals & Polymers Ltd.

EXAMPLE 2

In this Example a series of working fluid compositions were prepared comprising varying proportions of a lubricant comprising an ester of pentaerythritol and n-hexanoic acid and a heat transfer fluid comprising 70% by weight of R-134a and 30% by weight of R-32. The lubricant is at least partially soluble in each of the components of the heat transfer fluid and also in the fluid itself. The lower miscibility temperature of each composition was determined. The compositions were prepared and the lower miscibility temperatures determined using the procedure described in Example 1.

The results are shown in Table 2. In Table 2 it will be noticed that the lower miscibility temperature of one of the compositions is quoted as being less than −50° C. This means that at −50° C. phase separation was not observed.

TABLE 2

| Working fluid composition | | |
|---|---|---|
| % by weight of lubricant | % by weight of heat transfer fluid | Lower miscibility temperature (° C.) |
| 10.8 | 89.2 | −30 |
| 20.3 | 79.7 | −25 |
| 27.5 | 72.5 | −32 |
| 36.9 | 63.1 | −38 |
| 46.0 | 54.0 | −47 |
| 68.0 | 32.0 | <−50 |

EXAMPLE 3

In this Example a series of working fluid compositions were prepared comprising varying proportions of a lubricant and a heat transfer fluid comprising 70% by weight of R-134a and 30% by weight of R-32. The lubricant comprised an ester of dipentaerythritol, n-hexanoic acid and a branched $C_6$ carboxylic acid, i.e. a branched acid comprising 6 carbon atoms, and is at least partially soluble in each of the components of the heat transfer fluid and also in the fluid itself. The lower miscibility temperature of each composition was again determined. The compositions were prepared and the lower miscibility temperatures determined using the procedure described in Example 1.

The results are shown in Table 3. In Table 3 it will be noticed that the lower miscibility temperature of one of the compositions is quoted as being less than −55° C. This means that at −55° C. phase separation was not observed.

TABLE 3

| Working fluid composition | | |
|---|---|---|
| % by weight of lubricant | % by weight of heat transfer fluid | Lower miscibility temperature (° C.) |
| 10.0 | 90.0 | −32 |
| 17.3 | 82.7 | −28 |
| 38.0 | 62.0 | −35 |
| 46.2 | 53.8 | −41 |
| 57.8 | 42.2 | Slightly immiscible at −55 |
| 68.8 | 31.2 | <−55 |

EXAMPLE 4

In this Example a series of working fluid compositions were prepared comprising varying proportions of a lubricant and a heat transfer fluid comprising 70% by weight of R-134a and 30% by weight of R-32. The lubricant comprised a mixture of the lubricants used in Examples 2 and 3, i.e. a mixture comprising an ester of pentaerythritol and n-hexanoic acid and an ester of dipentaerytbritol, n-hexanoic acid and a branched $C_6$ carboxylic acid, and is at least partially soluble in each of the components of the heat transfer fluid and also in the fluid itself. The lower miscibility temperature of each composition was again determined. The compositions were prepared and the lower miscibility temperatures determined using the procedure described in Example 1.

The results are shown in Table 4. In Table 4 it will be noticed that the lower miscibility temperature of one of the compositions is quoted as being less than −50° C. This means that at −50° C. phase separation was not observed.

TABLE 4

| Working fluid composition | | |
|---|---|---|
| % by weight of lubricant | % by weight of heat transfer fluid | Lower miscibility temperature (° C.) |
| 10.5 | 89.5 | −31 |
| 19.7 | 80.3 | −27 |
| 28.9 | 71.1 | −29 |
| 41.1 | 58.9 | −32 |
| 48.0 | 52.0 | −39 |
| 55.2 | 44.8 | −46 |
| 69.7 | 30.3 | <−50 |

EXAMPLE 5

In this Example a series of working fluid compositions were prepared comprising varying proportions of a lubricant comprising an ester of pentaerythritol and n-hexanoic acid and a heat transfer fluid comprising 50% by weight of R-134a, 30% by weight of R-32 and 20% by weight of R-125. The lubricant is at least partially soluble in each of the components of the heat transfer fluid and also in the fluid itself. The lower miscibility temperature of each composition was again determined The compositions were prepared and the lower miscibility temperatures determined using the procedure described in Example 1.

The results are shown in Table 5. In Table 5 it will be noticed that the lower miscibility temperature of some of the compositions is quoted as being less than −50° C. This means that at −50° C. phase separation was not observed.

TABLE 5

| Working fluid composition | | |
|---|---|---|
| % by weight of lubricant | % by weight of heat transfer fluid | Lower miscibility temperature (° C.) |
| 10.2 | 89.8 | <−50 |
| 22.0 | 78.0 | −48 |
| 29.7 | 70.3 | <−50 |
| 41.6 | 58.4 | <−50 |
| 48.6 | 51.4 | <−50 |
| 60.7 | 39.3 | <−50 |

It will be appreciated that the binary mixtures of R-134a and R-32 and the ternary mixtures of R-134a, R-32 and R-125 which form the subject of the above Examples can also be used in combination with other neopentyl polyol ester type lubricants to yield viable working fluid compositions. Moreover, binary mixtures of R-134a and R-32 and ternary mixtures of R-134a, R-32 and R-125 comprising different proportions of the constituent hydrofluoroalkanes to the mixtures exemplified above can also be used in combination with neopentyl polyol ester type lubricants to yield viable working fluid compositions.

What is claimed is:

1. A working fluid composition consisting essentially of:

(A) a heat transfer fluid consisting of a mixture of at least two hydrofluoralkanes selected from the group consisting of difluoromethane, 1,1,1,2-tetrafluoroethane and pentafluoroethane; and (B) sufficient to provide lubrication of a lubricant which is at least partially soluble in each component of the heat transfer fluid and in said heat transfer fluid, said lubricant being selected from the group consisting of esters of general formula:

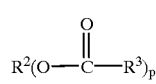

III wherein $R^2$ is the hydrocarbon radical remaining after removing the hydroxyl groups from pentaerythritol or dipentaerythritol;

each $R^3$ is independently, a linear alkyl group of 3 to 10 carbons or a branched alkyl group of 6 to 12 carbons; and p is an integer of 4 or 6, said lubricant being characterized by its thermal stability, hydrolytic stability and solubility and miscibility in said heat transfer fluid.

2. A working fluid composition as claimed in claim 1 wherein the heat transfer fluid (A) is a binary mixture consisting essentially of 1,1,1,2-tetrafluoroethane and difluoromethane.

3. A working fluid composition as claimed in claim 1 wherein the heat transfer fluid (A) is a mixture of:

(1) 1,1,1,2-tetrafluoroethane;

(2) difluoromethane; and (3) pentafluoroethane.

4. A working fluid composition as claimed in claim 1 wherein at least one $R^3$ group is a linear alkyl.

5. A working fluid composition as claimed in claim 1 wherein at least one $R^3$ group is a linear alkyl group and at least one $R^3$ group is a branched alkyl group.

6. A heat transfer device containing the working fluid composition claimed in claim 1.

* * * * *

/ # (12) EX PARTE REEXAMINATION CERTIFICATE (8880th)
United States Patent
Corr

(10) Number: US 6,245,254 C1
(45) Certificate Issued: Mar. 6, 2012

(54) LUBRICANTS

(75) Inventor: Stuart Corr, Runcorn (GB)

(73) Assignee: The Lubrizol Corporation, Wickliffe, OH (US)

Reexamination Request:
No. 90/011,385, Feb. 3, 2011

Reexamination Certificate for:
Patent No.: 6,245,254
Issued: Jun. 12, 2001
Appl. No.: 08/976,658
Filed: Nov. 24, 1997

Related U.S. Application Data

(63) Continuation of application No. 07/957,080, filed on Oct. 7, 1992, now abandoned.

(30) Foreign Application Priority Data

Oct. 11, 1991 (GB) ............................................. 9121657
Jul. 22, 1992 (GB) ............................................. 9215602

(51) Int. Cl.
*C09K 5/00* (2006.01)
*C09K 5/004* (2006.01)
*C10M 171/00* (2006.01)

(52) U.S. Cl. ................................ 252/68; 252/67; 252/73
(58) Field of Classification Search .......................... None
See application file for complete search history.

(56) References Cited

To view the complete listing of prior art documents cited during the proceeding for Reexamination Control Number 90/011,385, please refer to the USPTO's public Patent Application Information Retrieval (PAIR) system under the Display References tab.

*Primary Examiner*—Jerry D. Johnson

(57) ABSTRACT

A working fluid composition comprising:
(A) a heat transfer fluid comprising a mixture of at least two compounds selected from the group consisting of hydrofluoroalkanes and fluoroalkanes; and
(B) sufficient to provide lubrication of a lubricant which is at least partially soluble in each component of the heat transfer fluid.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 5 is cancelled.

Claims 1 and 4 are determined to be patentable as amended.

Claims 2, 3 and 6, dependent on an amended claim, are determined to be patentable.

New claim 7 is added and determined to be patentable.

1. A working fluid composition consisting essentially of:
   (A) a heat transfer fluid consisting of a mixture of at least two hydrofluoralkanes selected from the group consisting of difluoromethane, 1,1,1,2-tetrafluoroethane and pentafluoroethane; and
   (B) sufficient to provide lubrication of a lubricant which is at least partially soluble in each component of the heat transfer fluid and in said heat transfer fluid, said lubricant being selected from the group consisting of esters of general formula:

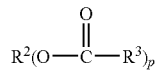

III wherein
   $R^2$ is the hydrocarbon radical remaining after removing the hydroxyl groups from pentaerythritol or dipentaerythritol;
   each $R^3$ is independently, a linear alkyl group of [3 to 10 carbons] *5 to 10 carbons;* or a branched alkyl group of 6 to [12 carbons;] *10 carbons;* and
   p is an integer of 4 or 6, said lubricant being characterized by its thermal stability, hydrolytic stability and solubility and miscibility in said heat transfer fluid.

4. A working fluid composition as claimed in claim 1 wherein [at least one $R^3$ group is a linear alkyl.] *each $R^3$ group is a linear alkyl group of 5 to 10 carbon atoms.*

7. *A working fluid composition as claimed in claim 1 wherein the heat transfer fluid (A) is a binary mixture consisting essentially of difluoromethane and pentafluoroethane.*

* * * * *